United States Patent [19]

Sinker, Jr. et al.

[11] Patent Number: 6,093,095
[45] Date of Patent: Jul. 25, 2000

[54] METHOD AND APPARATUS FOR EXHAUSTING GASES FROM PROCESSING TANK

[75] Inventors: Paul Walter Sinker, Jr., East Stroudsburg, Pa.; Brendan Joseph Meiers, Plainsboro, N.J.; Dana F. Edelman, Ruckersville, Va.

[73] Assignee: Benjamin Moore & Co., Montvale, N.J.

[21] Appl. No.: 09/063,008

[22] Filed: Apr. 21, 1998

Related U.S. Application Data

[63] Continuation-in-part of application No. 08/660,669, Jun. 5, 1996, Pat. No. 5,948,369.
[51] Int. Cl.[7] .......................... F16K 24/00; B05C 15/00
[52] U.S. Cl. ............................................. 454/49; 137/583
[58] Field of Search .................................. 137/587, 583; 454/49, 63; 134/22.1, 21

[56] References Cited

U.S. PATENT DOCUMENTS

| | | | |
|---|---|---|---|
| 673,078 | 4/1901 | Hadaway | 454/49 |
| 3,106,927 | 10/1963 | Madwed | 454/49 |
| 3,712,819 | 1/1973 | Field | 454/49 |

FOREIGN PATENT DOCUMENTS

| | | | |
|---|---|---|---|
| 2077419 | 12/1981 | United Kingdom | 454/49 |

*Primary Examiner*—Denise L. Ferensic
*Assistant Examiner*—Ken Reinhart
*Attorney, Agent, or Firm*—William E. Mouzavires

[57] ABSTRACT

An exhaust system for a liquid processing tank including an exhaust conduit provided in a cover closing the tank. The exhaust conduit communicates with an exhaust system externally of the tank and has an inlet port that is closed by a portion of the cover that is movable to an open position to allow access into the tank. Fumes or vapors from the liquid in the tank are removed through the inlet port and exhaust conduit to an external exhaust duct by suction produced in the exhaust system. When the movable portion of the cover is moved to its closed position closing the tank to allow processing of the liquid in the tank, the inlet port in the exhaust conduit is closed by the movable cover portion.

17 Claims, 3 Drawing Sheets

METHOD AND APPARATUS FOR EXHAUSTING GASES FROM PROCESSING TANK

RELATED APPLICATION

This application is a continuation-in-part of U.S. patent application Ser. No. 08/660,669 filed Jun. 5, 1996, now U.S. Pat. No. 5,948,369 the entire disclosure of which is hereby incorporated by reference into this application as part hereof.

OBJECTS OF THE PRESENT INVENTION

The present invention generally relates to processing vessels or tanks and more specifically to novel method and apparatus for exhausting gases such as vapors or fumes from liquids or other substances being processed in the tank. Although the invention is particularly useful in the processing of alkyd and latex paint liquids to remove vapors of mineral spirits, ethylene glycol, ammonia, methyl ethyl ketoxime, texanol and propylene glycol, the invention need not be limited to such liquids and/or vapors.

An object of the present invention is to provide novel and improved method and apparatus for safely exhausting or removing unwanted vapors or gases from vessels or tanks used in industry for processing liquids or other substances. Included herein is such apparatus that may be relatively inexpensive and easy to install and operate in connection with new or existing processing tanks or vessels.

A further object of the present invention is to provide a novel and improved liquid or gas processing tank or vessel that is equipped with apparatus that will contain unwanted gases, vapors or fumes within the tank during processing of substances therein but will facilitate safe removal and exhaust of gases or fumes when the tank is opened for inspection or for supplying the tank with liquids or other substances.

A still further object of the present invention is to provide a novel cover for a processing tank of the type described that will close the tank during processing but will allow access to the tank's interior while permitting gases, fumes, vapors to be removed from the tank.

SUMMARY OF PRESENT INVENTION

One preferred form of the invention utilizes an exhaust port provided in a cover of a processing tank. The cover has a portion movable between a closed position closing the inside of the tank which receives the liquids or other substances to be processed, and an open position which exposes the inside of the tank for inspection of its contents or for supplying the tank with liquids or other substances. A closure is fixed to the movable cover portion to close the exhaust port when the cover portion is in closed position, closing the tank so that the inside of the tank including substances being processed and gases, fumes or vapors are sealed from the ambient surroundings of the tank. When the cover portion is moved to open position, fumes, vapors and/or gases in the tank will be exhausted through the exhaust port in the cover and through an exhaust passage which leads to a suitable, environmentally safe, discharge terminal area. The vapors, fumes and/or gases are conveyed through the exhaust passage through suction generated by any suitable means, for example, a vacuum motor. When the cover portion is returned to closed position, its exhaust port will be closed by the closure on the cover portion so that no vapors, fumes and/or gases will escape the tank through the exhaust port during processing of liquids or other substances in the tank.

In one preferred embodiment of the invention, the exhaust port is provided in an exhaust conduit attached or formed on the top of the cover and having an outlet port communicating with the suction-exhaust passage.

DRAWINGS

Other objects and advantages of the present invention will become apparent from the more detailed description below in conjunction with the attached drawings in which.

DETAILED DESCRIPTION

Figure 1:
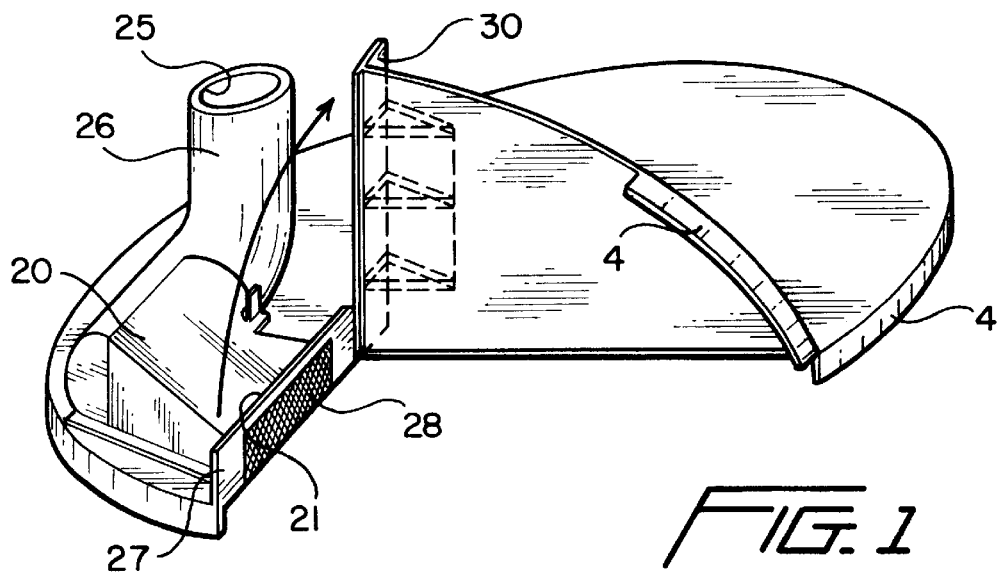
FIG. 1 is a perspective view of a cover for a processing tank constituting one preferred embodiment of the present invention and with a movable portion thereof shown in open position.
Figure 3:
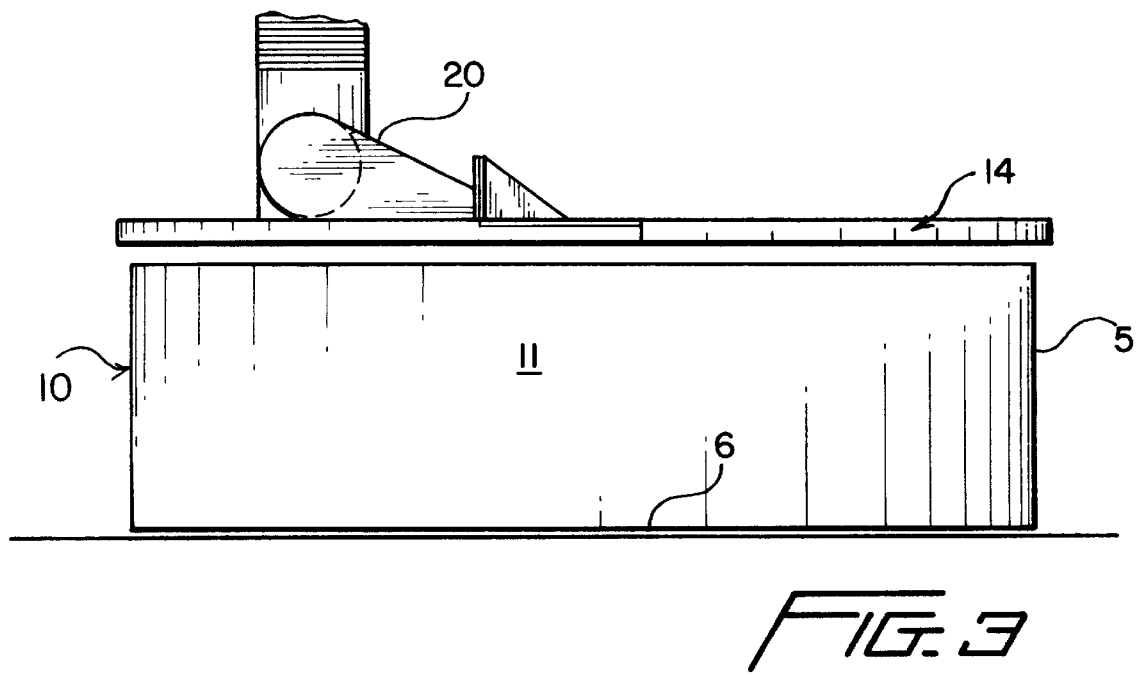
FIG. 3 is a side elevational view of a processing tank and the cover of FIG. 1 shown in spaced position above the tank for illustration purposes only.
Figure 2:
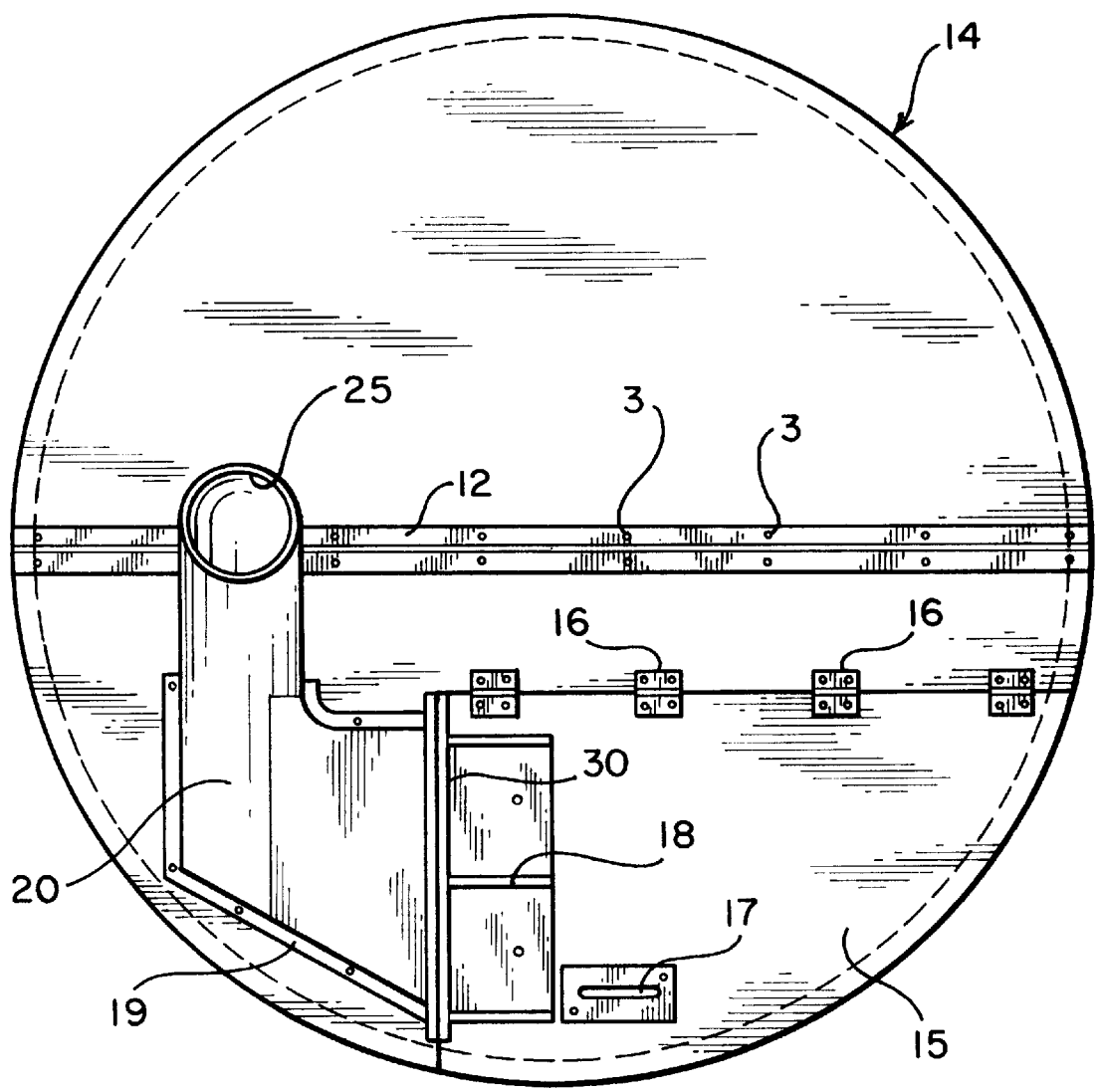
FIG. 2 is a plan view of the cover shown in closed position.

Referring now to the drawings in detail there is shown in FIGS. 1 to 3 for illustrative purposes only apparatus constituting a preferred embodiment of the present invention. The apparatus includes a vessel or tank generally designated 10 having a generally cylindrical shape including a base, opposite side and bottom walls 5 and 6 enclosing a space 11 for receiving liquid to be processed. Although shown as cylindrical in shape, the tank 10 may have any other shape. In one use of the tank for processing alkyd and latex paints, the tank 10 may have a diameter of five feet and a capacity of approximately 1375 gallons, however other liquids, sizes and capacities may be used in carrying out the present invention.

The top of the specific tank 10 shown is closed by a cover generally designated 14 having a generally circular or disk-like shape with a generally planar or horizontal surface and a depending circular lip 4 at its periphery. Cover 14 may be made from any suitable self-supporting or rigid material including plastic, wood, sheet metal, aluminum or steel and in the specific embodiment shown may be made in two pieces fixed together by a steel strap 12 shown in FIG. 2. Strap 12 may be made from two right angle channels fastened together by bolts or welding and fastened to the cover by bolts 3.

In order to provide access into the interior space 11 of the tank, the cover 14 is provided with a movable portion 15 movable between a closed position lying in the plane of the cover and an open position projecting upwardly from the cover as shown in FIG. 1 for allowing inspection or supply of liquid or other substance into the tank. In the shown embodiment, the movable portion 15 of the cover is mounted for pivotal movement between its open and closed positions by any suitable means such as hinges 16 shown in FIG. 2. Any suitable handle 17 may be provided for raising and lowering cover portion 15. Liquid or other substances are removed from the tank 10 by a discharge valve (not shown) at the base of the tank. The tank 10 may be made from any suitable material such as metal, plastic, or wood or a combination of these materials. Moreover the underside of the movable cover portion 15 may include a flexible material for estalishing a seal along the top of the side walls of the tank when the cover portion 15 is in the closed position shown in FIG. 2. The cover portion 15 may also be made of those materials although the preferred embodiment uses sheet aluminum or LEXAN brand plastic material.

In accordance with the present invention, a novel system is provided for exhausting gases, fumes, or vapors from the interior 11 of the tank to an exhaust passage formed in a duct (not shown) external of the tank. This duct contains a vacuum or any other suitable means for driving unwanted gases through the duct to a suitable discharge, environmentally safe area (not shown). The system includes the provision of a gas discharge or exhaust port on the cover 14 for communication with the exhaust passage. In the specific embodiment shown, the exhaust port is formed in one end of an exhaust conduit 20 fixed to the top of the cover and terminating at one end at 21 in the exhaust port above the plane of the cover as shown in FIG. 1. When the cover portion 15 is in the open position shown in FIG. 1 it provides access to the tank interior for inspection or recharging the tank with liquid or other substances. Additionally, the open position provides an exhaust port in the cover for allowing gases, vapors, etc. to escape into the exhaust port 21 at the inlet of the conduit 20. The exhaust gases leave the conduit 20 through an outlet port 25 formed in the other end of the conduit 20 by a vertical portion 26 thereof which is placed in communication with exhaust passage (not shown) leading to a safe disposal area for the gases.

When the cover portion 15 is closed as shown in FIGS. 2 and 3, the exhaust conduit 20 is closed at its inlet port 21 by a closure generally designated 30. Closure 30 is fixed to and upstanding from the cover portion 15 to close the inlet port of conduit 20 when cover portion 15 is moved to closed position as shown in FIG. 2. Closure 30 projects upwardly from cover portion 15 at generally right angles and in the specific embodiment is formed by a right angle channel member fixed to cover portion 15 and reinforced by braces 18. A flange 27 is fixed to the conduit 20 about port 21 to act as a seat for closure 30. A screen 28 having a wear resistant coating is fixed to flange 27 over port 21 as shown in FIG. 1. The exhaust conduit 20 is made from any suitable sheet metal or may be molded from plastic material and in the specific embodiment shown is fixed to the cover 14 by flanges 19 secured to the cover 14 by fasteners or any other suitable method. The conduit 20 thus provides an exhaust conduit whose inlet is at 21 and outlet at 25.

It will thus be seen that during processing of the liquids in the tank, the cover portion 15 will be closed so that the gases, fumes, etc. will not escape the tank. However when the cover portion is moved to the open position shown in FIG. 1, it will open the tank for inspection, or supply of liquid, and the exhaust fan will become effective to draw the gases from the top of the tank through exhaust port 21, conduit 20 and out port 25 connected to the exhaust passage in turn connected to a suitable discharge area. In the specific embodiment shown, the vacuum fan has a capacity to generate 490 cubic feet per minute of vacuum.

The exhaust conduit 20 may be configured and arranged on the cover in various other embodiments in addition to that shown in FIGS. 1, 3 and described above. For example, referring to the embodiment of FIG. 4, the exhaust conduit 50 may have an elongated, generally rectangular shape while being fixed by fasteners extending through plates 51 to extend along a chord line of the cover 40. The inlet port into the duct 50 is elongated and provided in the lower portion of the sidewall 51a of the conduit to communicate with the interior of the associated tank when the closure 44 is moved away from the port upon raising the movable cover portion 42. Closure 44 is elongated and fixed to movable cover 42 generally at right angles. Movable cover portion 42 is fixed to the conduit sidewall 51 by a plurality of hinges 54. The outlet of the conduit 50 is shown at 52 in one end of the conduit 50. Outlet port 52 is placed in communication with an exhaust passage (not shown) which leads to the eventual disposal area for the gases, fumes and vapors.

Figure 4:
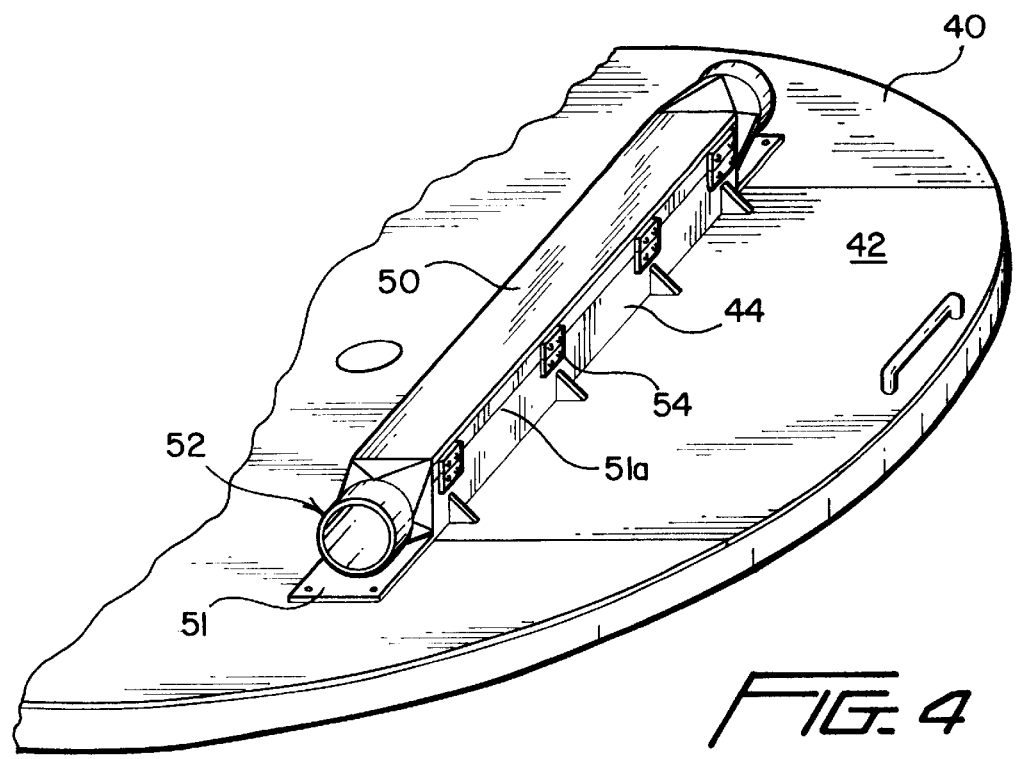
FIG. 4 is a fragmental perspective view of a cover constituting another preferred embodiment of the present invention.
Figure 5:
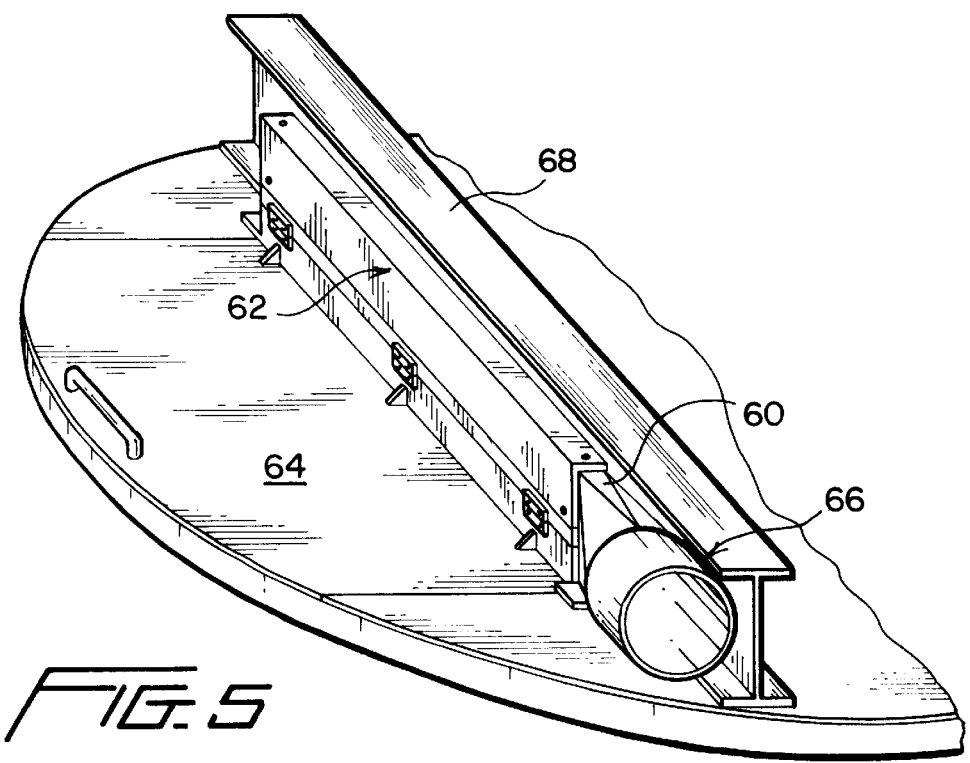
FIG. 5 is a fragmental, perspective view of another cover constituting another preferred embodiment of the present invention.

Referring to FIG. 5, it shows an exhaust conduit generally designated 60 similar to FIG. 4 with the exception that it is also supported by an elongated structural "I" beam member 68 along one side thereof. In addition the movable cover portion 64 is hinged to an inverted "L" shape bracket 62 which in turn is fixed to one side of the conduit. The inlet port is provided in the bottom portion of the bracket 62 and the sidewall of the conduit so that when the movable cover portion 64 is raised, an elongated inlet port will extend into the conduit along the lower side thereof. The gases will move along the conduit and exit from the outlet port 66 which will be in communication with another duct (not shown) leading to the eventual gas disposal area.

Although specific embodiments of the invention have been shown and described above, the invention is not to be limited to these embodiments but rather the scope of the invention is indicated in the appended claims and will cover various modifications readly apparent to those of ordinary skill in the art.

We claim:

1. A method of exhausting gases including fumes and vapors from a space in a processing tank to an external exhaust area, the method comprising the steps of providing a cover on the tank for closing the space in the tank, providing the cover with a portion movable between a closed position closing the space and an open position opening the space, providing the cover with an exhaust conduit communicating with the external exhaust system, and providing a closure on said movable cover portion closing said exhaust conduit when said cover portion is in said closed position and opening said exhaust conduit when said cover portion is in said open position for exhausting gases from the tank through said exhaust conduit.

2. A system for exhausting gases including vapors or fumes from a processing container such as a vessel or a tank, comprising in combination: a container enclosing a space for receiving and processing substances, a cover having a portion movable between a closed position closing said space and an open position opening said space, said cover having an exhaust conduit for communication with an exhaust system, said cover portion including a closure closing said exhaust conduit when said portion is in said closed position and opening said exhaust conduit when said portion is in said open position whereby gases in the tank may be exhausted through said exhaust conduit when said cover portion is in said open position.

3. The system defined in claim 2 wherein said exhaust conduit extends above the plane of the cover and includes an inlet port located above the plane of the cover, and said closure projects above the plane of the cover to close said port when the movable portion is in said closed position.

4. A cover for a processing tank for substances from which gases including vapors and fumes are discharged, the cover comprising in combination: a body dimensioned to close an associated processing tank and including an exhaust conduit, said cover including a movable portion movable between a closed position for closing the tank and an open position providing access to the tank, said movable portion having a closure for closing said conduit when in said closed position and for opening said conduit when in said open position for exhausting gases through said conduit.

5. The cover defined in claim 4 wherein said exhaust conduit has an inlet port closed and opened by said closure and an outlet port for communication with an exhaust system located externally of the tank.

6. The cover defined in claim 5 wherein said movable portion of said cover is pivotally mounted to said exhaust conduit.

7. The cover defined in claim 6 wherein said inlet port is located on the side of the cover and said movable portion of the cover is pivotally mounted to the side of the cover on one side of said inlet port.

8. The cover defined in claim 7 wherein said outlet port is located in the end of the exhaust conduit.

9. A processing container enclosing a space for receiving and processing substances, a cover having a portion movable between a closed position closing said space and an open position opening said space, said cover having an exhaust port for communication with an exhaust system external to the container, said cover portion including a closure closing said exhaust port when said portion is in said closed position and opening said exhaust port when said portion is in said open position whereby gases in the tank may be exhausted through said exhaust port when said portion is in said open position.

10. The cover defined in claim 4 including means mounting said movable portion to said cover for pivotable movement between said closed and open positions of said movable portion.

11. The cover defined in claim 5 wherein said inlet port and said closure are both raised above the plane of the cover.

12. The cover defined in claim 4 wherein said closure is located on an end of said movable cover portion.

13. The cover defined in claim 4 wherein said exhaust conduit is attached to a top surface of said cover.

14. The processing container defined in claim 9 including means mounting said movable portion to said cover for pivotable movement between said closed and open positions of said movable portion.

15. The processing container defined in claim 14 wherein said exhaust port and said closure are both raised above the plane of the cover.

16. The processing container defined in claim 9 wherein said exhaust port and said closure are both raised above the plane of the cover.

17. The processing container defined in claim 9 wherein said exhaust port is attached to the top surface of said cover.

\* \* \* \* \*